(12) United States Patent
Horn et al.

(10) Patent No.: US 12,144,074 B2
(45) Date of Patent: Nov. 12, 2024

(54) AMBIENT LIGHT DETECTION BY MEANS OF TWO LIGHT SENSORS ARRANGED WITHIN A LUMINAIRE

(71) Applicant: Tridonic GmbH & Co KG, Dornbirn (AT)

(72) Inventors: Frank Horn, Engi (CH); Huang Pengcheng, Zürich (CH); Roger Kistler, Ennenda (CH); Thomas Kuch, Richterswil (CH); Markus Künzli, Glarus (CH); Eduardo Pereira, Siebnen/SZ (CH); Hans Schlumpf, Schänis (CH); John Schönberger, Altendorf (CH)

(73) Assignee: Tridonic GmbH & Co KG, Dornbirn (AT)

(*) Notice: Subject to any disclaimer, the term of this patent is extended or adjusted under 35 U.S.C. 154(b) by 156 days.

(21) Appl. No.: 17/801,366

(22) PCT Filed: Feb. 16, 2021

(86) PCT No.: PCT/EP2021/053775
§ 371 (c)(1),
(2) Date: Aug. 22, 2022

(87) PCT Pub. No.: WO2021/170455
PCT Pub. Date: Sep. 2, 2021

(65) Prior Publication Data
US 2023/0077494 A1    Mar. 16, 2023

(30) Foreign Application Priority Data
Feb. 24, 2020  (DE) .................. 10 2020 104 754.1

(51) Int. Cl.
H05B 45/10    (2020.01)
H05B 45/12    (2020.01)
H05B 47/11    (2020.01)

(52) U.S. Cl.
CPC ............ H05B 45/12 (2020.01); H05B 47/11 (2020.01)

(58) Field of Classification Search
CPC ........ H05B 45/10; H05B 45/12; H05B 47/10; H05B 47/11
See application file for complete search history.

(56) References Cited

U.S. PATENT DOCUMENTS

2014/0354150 A1* 12/2014 Joseph .................. H05B 45/22
                                                                    315/51
2017/0290129 A1  10/2017 Kashani

FOREIGN PATENT DOCUMENTS

DE    102011084180 B3 *  1/2013 ......... A47L 15/0057
DE    20 2015 105150      1/2017
(Continued)

OTHER PUBLICATIONS

PCT/EP2021/053775, International Search Report and Written Opinion, May 3, 2021, 12 pages.

*Primary Examiner* — Jimmy T Vu
(74) *Attorney, Agent, or Firm* — Andrus Intellectual Property Law, LLP

(57) ABSTRACT

The present invention relates to a luminaire (1), comprising a housing (2) having a diffusion panel (3) as light emission surface, comprising at least one illuminant (4) which is arranged within the housing (2) such that it is set up to emit light through the diffusion panel (3) to the area outside of the housing (2), and comprising at least two light sensors (S1, S2) arranged within the housing (2), the light sensors being set up to detect light. The at least two light sensors (S1, S2) have different detection regions (B1, B2) within the housing
(Continued)

(2) and are set up to detect light ($E_t$) which enters through the diffusion panel (3) into the housing interior from the area outside of the housing (2), wherein, on account of the different detection regions (B1, B2), one of the at least two light sensors (S1, S2) detects light ($E_{r2}$) that was emitted by the at least one illuminant (4) and reflected from at least one wall of the housing interior. The invention further relates to a lighting system having at least one such luminaire and to a method for detecting the ambient light of such a luminaire.

10 Claims, 4 Drawing Sheets

(56) References Cited

FOREIGN PATENT DOCUMENTS

| | | | |
|---|---|---|---|
| EP | 2900037 | 7/2015 | |
| WO | 2009034515 | 3/2009 | |
| WO | WO-2009034515 A2 * | 3/2009 | ............... G01J 1/02 |
| WO | 2010115801 | 10/2010 | |

* cited by examiner

AMBIENT LIGHT DETECTION BY MEANS OF TWO LIGHT SENSORS ARRANGED WITHIN A LUMINAIRE

CROSS REFERENCE TO RELATED APPLICATIONS

The present application is the U.S. national stage application of international application PCT/EP2021/053775 filed Feb. 16, 2021, which international application was published on Sep. 2, 2021 as International Publication WO 2021/170455 A1. The international application claims priority to German Patent Application No. 10 2020 104 754.1 filed Feb. 24, 2020.

TECHNICAL FIELD OF THE INVENTION

The present invention relates to a luminaire comprising at least two light sensors, a lighting system comprising at least one such luminaire, and a method for operating such a luminaire, in particular a method for detecting the ambient light of such a luminaire.

BACKGROUND OF THE INVENTION

Light sensors are used in buildings, in particular rooms, and in the open for brightness adjustment of a luminaire comprising at least one illuminant. For example, a light sensor is used to adjust a brightness at a location of a room, such as a workplace, according to a target brightness of a workplace illuminated by a luminaire. For this purpose, at least one light sensor must be arranged in the surroundings of the luminaire such that the light sensor can detect or measure the ambient light of the luminaire and, consequently, the light at the workplace. The detection result or measurement result is then typically transmitted from the light sensor to the luminaire and used as an instantaneous value of the brightness at the workplace in order to adjust the brightness of the luminaire to a target value.

The disadvantage of such a lighting system comprising a light sensor and a luminaire having at least one illuminant is that without special protective measures the light sensor can be damaged, for example due to vandalism. This could be avoided by arranging the light sensor in a corresponding housing that provides protection against vandalism. However, this is associated with costs and increases the dimensions of a single light sensor.

Furthermore, the light sensor can be damaged or even destroyed by penetrating moisture, and light detection by the light sensor can be impaired or made impossible on account of contamination. This can likewise be avoided by an arrangement of the light sensor in a corresponding housing, but this again leads to the disadvantages of increased costs and increased dimensions of the light sensor.

In addition, the leak-tightness of the luminaire can also be impaired, in particular if the detection results of the light sensor are transmitted in a wire-bound manner, because leakages can occur at the transition between a cable for the wire-bound transmission and the luminaire housing. This can be avoided by corresponding provision of precautions for connecting the cable to the luminaire housing, as a result of which the leak-tightness of the luminaire is not impaired. However, this is again associated with corresponding effort and costs.

One possibility of overcoming the above disadvantages would be to arrange the light sensor directly in the housing interior of the luminaire. The housing of the luminaire would specifically protect the light sensor against vandalism, dirt and moisture. Furthermore, the leak-tightness of the luminaire could also no longer be impaired by a cable as a wire-bound transmission path from a light sensor arranged outside the housing to the luminaire housing.

The disadvantage of this option is that a light sensor arranged within the luminaire housing would detect not only the ambient light, but also the light which is radiated or emitted within the luminaire housing by the at least one illuminant of the luminaire Consequently, the brightness of the light radiated by the luminaire could not be regulated on the basis of the detected instantaneous brightness of the ambient light with respect to a target brightness.

SUMMARY OF THE INVENTION

In light of this prior art, it is therefore an object of the present invention to provide a luminaire in which the ambient light of the luminaire can be detected without the disadvantages described above occurring.

These and other objects, which will be mentioned during reading of the following description or which can be recognized by a person skilled in the art, are achieved by the subject-matter of the independent claims. The dependent claims develop the central idea of the present invention in a particularly advantageous manner.

According to an aspect of the present invention, a luminaire comprising a housing having a diffusion panel as a light emission surface is provided, comprising at least one illuminant which is arranged within the housing in such a way that it is set up to emit light through the diffusion panel to the area outside of the housing, and comprising at least two light sensors arranged within the housing that are set up to detect light. The at least two light sensors have different detection regions and are set up to detect light, wherein the detection region of the first of the at least two light sensors is such that light emitted by the at least one illuminant and reflected from at least one wall of the housing interior is detected.

In other words, the present invention proposes to arrange at least two light sensors having different detection regions within the housing of a luminaire (to be integrated into the luminaire housing) in order to be able to detect or measure the light entering or incident through the diffusion panel into the housing interior of the luminaire from the area outside of the housing. In this case, at least one first light sensor of the at least two light sensors is set up to detect or measure light which is emitted by the at least one illuminant of the luminaire and is reflected from at least one wall of the housing interior of the luminaire.

That is to say that the detection region of the at least one first light sensor is set such that the first light sensor detects light emitted by the at least one illuminant and reflected from at least one wall of the housing interior, or that light emitted by the at least one illuminant in the detection region of the first light sensor and reflected from at least one wall of the housing interior strikes the first light sensor.

The at least one wall of the housing interior is in particular at least one side wall or lateral wall of the housing interior.

Consequently, the at least one first light sensor of the at least two light sensors is set up in particular to detect diffused light in the housing interior. In other words, the detection region of the at least one first light sensor is set in particular such that the first light sensor detects diffused light in the housing interior or that diffused light in the housing interior strikes the first light sensor in the detection region of the first light sensor.

This makes it possible to detect the ambient light of the luminaire, because the detection of the light emitted by the at least one illuminant and reflected from at least one wall of the housing interior makes it possible to deduce the proportion of the light detected by the at least two light sensors in the housing interior that was originally emitted by the at least one illuminant.

Thus, the luminaire according to one aspect of the present invention is advantageous, because the above-described disadvantages with respect to a light sensor arranged outside the luminaire are eliminated by the arrangement of the at least two light sensors in the housing interior. Furthermore, the at least two light sensors in the housing interior can detect the light which enters through the diffusion panel into the housing interior from the area outside of the luminaire housing, and consequently the ambient light of the luminaire, on account of their different detection regions.

Therefore, the luminaire according to the invention makes it possible for the light emitted by the at least one illuminant of the luminaire to be set to a brightness for achieving a target brightness on the basis of the detected ambient light of the luminaire without the disadvantages described above occurring.

The term "diffusor" can be used as a synonym for the term "diffusion panel."

The term "detection region" of a light sensor is understood to mean the region in the housing interior within which the light sensor can detect light. This means that a light sensor does not detect any light which is present outside the detection region of the light sensor or which strikes the light sensor in the area outside of the detection region.

The terms "radiated light" and "emitted light" can be used synonymously for the term "emitted light," and the term "incident light" can be used synonymously for the term "entering light."

Preferably, the at least two light sensors have different detection angles.

The housing is preferably set up to provide protection against moisture, in particular spray water, and contamination, in particular dust.

The at least one illuminant comprises or corresponds to at least one light-emitting diode (LED), such as, for example, an organic light-emitting diode, inorganic light-emitting diode, light-emitting diode with secondary excitation, etc. However, the at least one illuminant can also additionally or alternatively comprise or correspond to at least one other illuminant type, such as, for example, a fluorescent tube, gas discharge lamp, energy-saving lamp, etc.

The terms "photo detector" and "opto-electronic sensor" may be used as synonyms for the term "light sensor." An example of a light sensor is a photo cell, a CMOS sensor, a CCD sensor, a photodiode, etc. The at least two light sensors can correspond to different light sensor types.

Preferably, the at least two light sensors arranged in the housing interior of the luminaire are identical light sensors which have different detection regions in the housing interior of the luminaire.

The luminaire comprises two light sensors, wherein a first light sensor detects light emitted by the at least one illuminant and reflected from at least one wall of the housing interior.

In other words, the detection region of the first light sensor of the two light sensors is set such that the first light sensor detects light emitted by the at least one illuminant and reflected from at least one wall of the housing interior, or that light emitted by the at least one illuminant in the detection region of the first light sensor and reflected from at least one wall of the housing interior strikes the first light sensor.

In particular, the detection region of the first light sensor is selected so as to detect light entering or incident through the diffusion panel into the housing interior from the area outside of the housing and light emitted by the one illuminant and reflected from the diffusion panel and from at least one wall of the housing interior.

In other words, in particular the detection region of the at least one first light sensor is set in such a way that the first light sensor detects light which enters through the diffusion panel into the housing interior from the area outside of the housing and light emitted by the one illuminant and reflected from the diffusion panel and from at least one wall of the housing interior, or that, in the detection region of the first light sensor, light which enters through the diffusion panel into the housing interior from the area outside of the housing and light emitted by the one illuminant and reflected from the diffusion panel and from at least one wall of the housing interior strikes the first light sensor.

Preferably, a second of the at least two light sensors is set up to detect exclusively light from the region of the diffusion panel.

In other words, the detection region of the at least one second light sensor is preferably set such that the second light sensor detects exclusively light from the region of the diffusion panel or that exclusively light from the region of the diffusion panel strikes the second light sensor in the detection region of the second light sensor.

According to the preferred embodiment, the luminaire comprises two light sensors, wherein a second light sensor of the two light sensors is preferably set up to detect exclusively light from the region of the diffusion panel.

Preferably, the at least two light sensors are arranged within the housing (in the housing interior) such that they comprise the different detection regions.

This means that the different detection regions of the at least two light sensors are preferably attained by the arrangement or positioning of the at least two light sensors in the housing interior. For example, the different detection regions of the at least two light sensors in the housing interior can be attained in that the at least two light sensors are arranged at different positions or locations in the housing interior.

Additionally or alternatively, at least one light sensor of the at least two light sensors preferably comprises a mechanical and/or optical device which is set up to change, in particular enlarge and/or reduce, the detection region of the at least one light sensor, so that the at least two light sensors have the different detection regions.

In particular, in addition or alternatively at least one light sensor of the at least two light sensors comprises a mechanical device for reducing the individual detection region and/or an optical device for enlarging the individual detection region, so that the at least two light sensors have the different detection regions.

In other words, the mechanical and/or optical device preferably comprises or corresponds to a mechanical device which is set up to reduce the detection region of a light sensor, and/or an optical device which is set up to enlarge the detection region of a light sensor.

The mechanical device is preferably an aperture. However, the mechanical device is not limited to an aperture and can also be designed in some other way. The optical device is preferably a diffusion panel. However, the optical device is not limited to a diffusion panel and can also be designed in some other way.

Furthermore, the at least one illuminant and the at least two light sensors are preferably arranged on a surface.

In particular, the at least one illuminant and the at least two light sensors are arranged in one plane on the surface.

Preferably, the surface corresponds to a printed circuit board. This means that the at least one illuminant and the at least two light sensors are preferably arranged on a printed circuit board. In particular, the at least one illuminant and the at least two light sensors are arranged in one plane on the printed circuit board.

Preferably, the luminaire further comprises a processing device, wherein the processing device is set up to determine the ambient light of the luminaire on the basis of detection values detected by the at least two light sensors.

In other words, the luminaire further comprises a processing device which is set up to process the detection values of the at least two light sensors in order to determine the ambient light of the luminaire.

The processing device is preferably arranged within the housing of the luminaire.

The processing device is preferably arranged on the surface, in particular on the printed circuit board.

The processing device is preferably a processor, a microprocessor, a controller, a microcontroller, an application-specific integrated circuit (ASIC) or any combination of these elements.

Furthermore, the processing device is preferably set up to determine the light emitted by the one illuminant on the basis of detection values detected by the at least one first light sensor in order to determine the ambient light of the luminaire.

In particular, the processing device is set up to determine the ambient light of the luminaire on the basis of the detection values detected by the at least one second light sensor and of the determined light emitted by the one illuminant.

Preferably, the processing device is preferably set up to determine the ambient light of the luminaire using mathematical models and/or comparative measurements of known light situations of the surroundings of the luminaire.

In other words, the processing device is preferably set up to process the detection values of the at least two light sensors using mathematical models/algorithms and/or comparative measurements of known light situations of the surroundings of the luminaire in order to determine the ambient light of the luminaire.

Preferably, the mathematical models/algorithms and/or comparative measurements are stored in a memory of the luminaire, preferably of the processing device, which the processing device can access. The processing device can in particular write data into the memory and read data from the memory. Additionally or alternatively, the mathematical models/algorithms and/or comparative measurements, which are preferably stored in the memory, can be supplied to the processing device from the area outside of the luminaire.

In particular, the processing device is set up to generate at least one characteristic curve on the basis of the comparison measurements and to determine the ambient light of the luminaire using the at least one characteristic curve.

That is to say, the processing device is in particular set up to generate at least one characteristic curve on the basis of the comparison measurements and to process the detection values of the at least two light sensors using the at least one characteristic curve in order to determine the ambient light of the luminaire.

The processing device preferably stores the at least one characteristic curve in the memory.

The processing device is preferably set up to control the light emission of the at least one illuminant.

Preferably, the processing device is set up to control, preferably to dim, the light emission of the at least one illuminant on the basis of the detection values, preferably the determined ambient light.

The processing device is preferably set up to determine the ambient light on the basis of the detection values of the at least two light sensors and to control, in particular to dim, the light emission of the at least one illuminant on the basis of the determined ambient light.

Preferably, the processing device is set up to deduce the brightness in the surroundings of the luminaire on the basis of the detection values, in particular on the basis of the determined ambient light of the luminaire, and to control the light emission of the at least one illuminant on the basis of the brightness of the surroundings of the luminaire in such a way that a brightness setpoint value for the surroundings is attained. The brightness setpoint value can be supplied to the processing device from outside and/or stored in the memory of the luminaire.

Consequently, a regulation of the light emission of the at least one illuminant of the luminaire can take place, so that the light emission of the luminaire can be changed, in particular dimmed, by changing the brightness setpoint value.

Additionally or alternatively, the processing device is preferably set up to control the light emission of the at least one illuminant on the basis of at least one control command, such as, for example, a dimming value. The processing device is in particular set up here to obtain or receive the at least one control command supplied from outside or from the area outside of the luminaire.

In order to attain the luminaire according to the invention, the above optional features can be combined as desired.

According to a further aspect of the present invention, a lighting system is provided with at least one above-described luminaire according to the invention and with a processing device set up to control the light emission of the at least one luminaire.

The above description of the luminaire according to the invention is likewise applicable for the at least one luminaire of the lighting system according to a further aspect of the present invention.

The processing device is preferably designed according to the processing device of a luminaire according to the invention described above. In other words, the processing device preferably corresponds to the processing device of a luminaire according to the invention described above.

The processing device of the lighting system is preferably a processor, a microprocessor, a controller, a microcontroller, an application-specific integrated circuit (ASIC) or any combination of these elements.

In the event that the at least one luminaire comprises a processing device, the processing device of the lighting system is preferably set up to obtain detection values of the at least two light sensors of the at least one luminaire supplied directly or indirectly via the processing device of the luminaire.

Alternatively or additionally, the processing device of the lighting system is preferably set up to control the light emission of the at least one illuminant of the at least one luminaire, in particular on the basis of the detection values of the at least two light sensors of the at least one luminaire.

Therefore, as explained above, according to a further aspect of the present invention, a lighting system is provided with at least one above-described luminaire according to the invention and with a processing device, preferably according to the processing device of an above-described luminaire according to the invention that is set up to control the light emission of the at least one luminaire.

In order to attain the lighting system according to the invention, the above optional features can be combined as desired.

According to a further aspect of the present invention, a method for operating an above-described luminaire according to the invention, in particular a method for detecting the ambient light of an above-described luminaire according to the invention, is provided, wherein the method comprises the following method steps: detecting, by means of the at least two light sensors of the luminaire having different detection regions within the housing, light which enters through the diffusion panel into the housing interior from the area outside of the housing; and detecting, by means of a first of the at least two light sensors, light which is emitted by the at least one illuminant and is reflected from at least one wall of the housing interior.

The above description of the luminaire according to the invention is accordingly applicable for the method according to a further aspect of the present invention.

The method preferably comprises the following method step: detecting, by means of the at least one first light sensor of the at least two light sensors, light which enters through the diffusion panel into the housing interior from the area outside of the housing, and light which is emitted by the one illuminant and is reflected from the diffusion panel and from at least one wall of the housing interior.

Furthermore, the method preferably comprises the following method step: detecting, by means of at least one second light sensor of the at least two light sensors, exclusively light from the region of the diffusion panel.

In particular, the method comprises the following method step: detecting, by means of at least one second light sensor of the at least two light sensors, exclusively light which enters through the diffusion panel into the housing interior from the area outside of the housing, and light that is emitted by the at least one illuminant and reflected from the diffusion panel.

Preferably, the luminaire further comprises a processing device, and the method preferably comprises the following further method step: Determining, by means of the processing device, the ambient light of the luminaire on the basis of detection values detected by the at least two light sensors.

Furthermore, the method preferably comprises the following method step: determining, by means of the processing device, the light emitted by the one illuminant on the basis of detection values detected by the at least one first light sensor in order to determine the ambient light of the luminaire.

In particular, the method preferably comprises the following method step: Determining, by means of the processing device, the ambient light of the luminaire on the basis of the detection values detected by the at least one second light sensor and the determined light emitted by the one illuminant.

Preferably, the method comprises the following method step: Determining, by means of the processing device, the ambient light of the luminaire using mathematical models and/or comparative measurements of known light situations of the surroundings of the luminaire.

Preferably, the method comprises the following method step: controlling, by means of the processing device, the light emission of the at least one illuminant on the basis of the detection values, preferably on the basis of the determined ambient light.

In particular, the method comprises the following method step dimming, by means of the processing device, the light emission of the at least one illuminant on the basis of the detection values, preferably on the basis of the determined ambient light.

In order to attain the method according to the invention, the above optional features can also be combined with one another.

BRIEF DESCRIPTION OF THE DRAWINGS

A detailed description of the figures is given below. These show.

DETAILED DESCRIPTION OF THE PREFERRED EMBODIMENTS

Corresponding elements are provided with the same reference signs In FIGS. 1 to 4.

Figure 1:
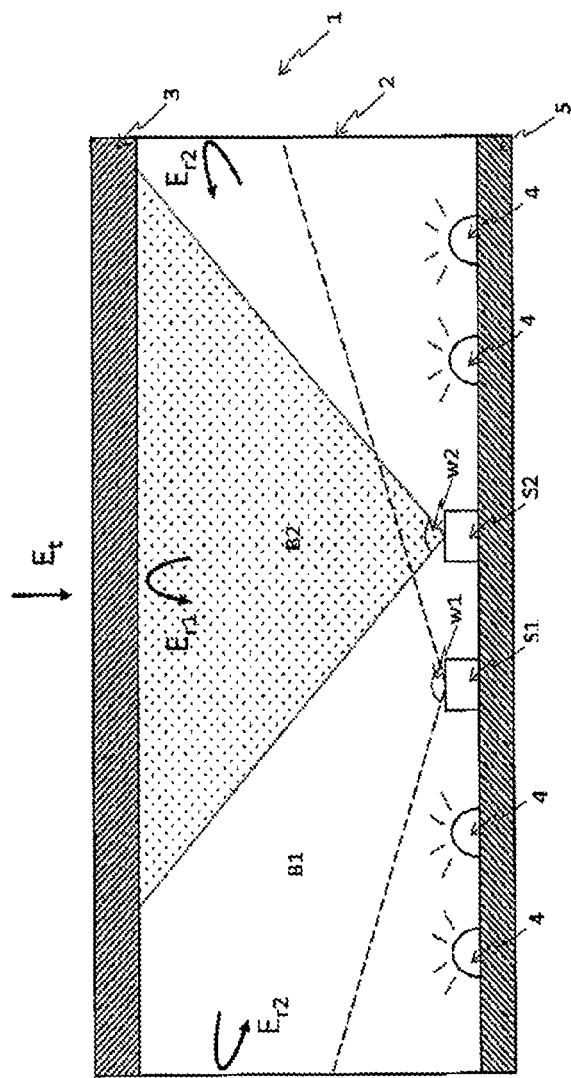
FIG. 1 is a schematic side view of a preferred embodiment of a luminaire according to the invention.

FIG. 1 shows a schematic side view of a preferred embodiment of a luminaire according to the invention.

The above description of the luminaire according to one aspect of the present invention is accordingly applicable for the luminaire 1 of FIG. 1.

The luminaire 1 shown in FIG. 1 comprises a housing 2 (luminaire housing), a diffusion panel 3, four illuminants 4, two light sensors S1 and S2 and a printed circuit board 5.

As already stated above, the luminaire 1 can also have fewer or more illuminants (at least one illuminant) and more than two light sensors (at least two light sensors), so that the number of illuminants and light sensors of the luminaire 1 of FIG. 1 is merely exemplary and serves to explain a preferred embodiment of a luminaire according to the invention.

The illuminants 4 and the two light sensors S1 and S2 can be designed as described above with regard to the luminaire according to one aspect of the present invention.

According to FIG. 1, the four illuminants 4 and the two light sensors S1 and S2 are arranged on the printed circuit board 5 of the luminaire within the housing 2 (luminaire housing) of the luminaire 1. In other words, the four illuminants 4 and the two light sensors S1 and S2 are arranged within the luminaire housing 2. In particular, the illuminants 4 and the light sensors S1 and S2 are arranged next to each other or in a row on the printed circuit board.

The luminaire 1 comprises the diffusion panel 3 as a light emission surface, so that the light emitted by the illuminants 4 is emitted or radiated through the diffusion panel 3 to the area outside of the housing 2. This then corresponds to the light emission of the luminaire 1. Consequently, the illuminants 4 are arranged in the housing interior 2 of the luminaire 1, in particular on the printed circuit board 5, in such a way that they are set up to emit light through the diffusion panel 3 to the area outside of the housing 2.

The two light sensors S1 and S2 have different detection regions B1 and B2. These different detection regions B1 and B2 are attained by a different arrangement of the two light sensors S1 and S2 in the housing interior. According to FIG. 1, the two light sensors S1 and S2 also have different detection angles w1 and w2. The different detection regions B1 and B2 are consequently also attained in that at least one of the two light sensors S1 and S2 comprises a mechanical and/or optical device (not shown in FIG. 1) which is set up to change, in particular reduce and/or enlarge, the detection region of the at least one light sensor.

The mechanical and/or optical device can be designed as described above with regard to the luminaire according to one aspect of the present invention.

As already stated above, the different detection regions B1 and B2 can also be attained by a different arrangement of the two light sensors S1 and S2 in the housing interior. Preferably, in this case the two light sensors S1 and S2 have the same detection angles w1 and w2. Alternatively or additionally, at least one light sensor of the two light sensors S1 and S2 can comprise a mechanical and/or optical device which is set up to change, in particular to reduce and/or enlarge, the detection region of the at least one light sensor.

As is shown in FIG. 1, the first light sensor S1 is set up to detect light Ere which is emitted by the illuminants 4 and is reflected from at least one wall of the housing interior of the luminaire 1. In other words, the detection region B1 of the first light sensor S1 is set such that the first light sensor S1 detects light which is emitted by the illuminants 4 and is reflected from at least one wall of the housing interior.

In particular, the first light sensor S1 is set up to detect light $E_t$ entering or incident through the diffusion panel 3 into the housing interior from the area outside of the housing 2, light $E_{r1}$ emitted or radiated by the illuminants 4 and reflected from the diffusion panel 3, and light $E_{r2}$ emitted by the illuminants 4 and reflected from at least one wall of the housing interior.

As shown in FIG. 1, the at least one wall of the housing interior is in particular at least one side wall or lateral wall of the housing interior.

The light incident on the first light sensor S1 in the detection region B1 of the first light sensor S1 is thus composed of light $E_t$ which enters through the diffusion panel 3 into the housing interior from the area outside of the housing 2; light $E_{r1}$ emitted by the illuminants 4 and reflected from the diffusion panel 3, and light $E_{r2}$ emitted by the illuminants 4 and reflected from at least one wall of the housing interior.

The light $E_{r1}$ emitted by the illuminants 4 and reflected from the diffusion panel 3 and the light $E_{r2}$ emitted by the illuminants 4 and reflected from at least one wall of the housing interior do not contribute to the illumination of the surroundings by the luminaire 1.

The light $E_{r1}$ emitted by the illuminants 4 and reflected from the diffusion panel 3 and the light $E_{r2}$ emitted by the illuminants 4 and reflected from at least one wall of the housing interior can also be referred to as diffused light. Consequently, the first light sensor S1 is set up to detect diffused light in the housing interior. In other words, the detection region B1 of the first light sensor S1 is set such that the first light sensor S1 detects diffused light in the housing interior or that diffused light in the housing interior strikes the first light sensor S1 in the detection region B1 of the first light sensor S1.

As shown in FIG. 1, the second light sensor S2 is set up to detect light exclusively from the region of the diffusion panel 3. This means that the second light sensor S2 is set up to detect light exclusively from the region of the diffusion panel 3. In other words, the detection region B2 of the second light sensor S2 is set such that the second light sensor S2 detects light exclusively from the region of the diffusion panel 3, or that exclusively light from the region of the diffusion panel 3 strikes the second light sensor S2 in the detection region B2 of the second light sensor S2.

Consequently, by means of the second light sensor S2, no light $E_{r2}$ is detected which is emitted by the illuminants 4 and is reflected from one or more walls of the housing interior of the luminaire 1. In other words, the detection region B2 of the second light sensor S2 is set such that, in the detection region B2 of the second light sensor S2, light $E_{r2}$ emitted by the illuminants 4 and reflected from one or more walls of the housing interior does not strike the second light sensor S2.

Specifically, the second light sensor S2 is set up to detect exclusively light $E_t$ which enters through the diffusion panel 3 into the housing interior from the area outside of the housing 2 and light $E_{r1}$ emitted by the illuminants 4 and reflected from the diffusion panel 3. That is to say, the light which strikes the second light sensor S2 in the detection region B2 of the second light sensor S2 is composed of light $E_t$ which enters through the diffusion panel 3 into the housing interior from the area outside of the housing 2; and light $E_{r1}$ emitted by the illuminants 4 and reflected from the diffusion panel 3.

The two light sensors S1 and S2 are set up to provide or supply their detection results, i.e., detection values, to a processing device, which device can then determine the ambient light of the luminaire 1 on the basis of these detection values that are detected by the two light sensors S1 and S2. Consequently, the two light sensors S1 and S2, in particular the detection values detected by them, make it possible to deduce the ambient light of the luminaire 1.

Preferably, the luminaire 1 comprises such a processing device. Such a luminaire is shown in FIG. 2.

The two light sensors S1 and S2 are in particular set up to provide their detection results to the outside or to the area outside of the luminaire housing.

Figure 2:
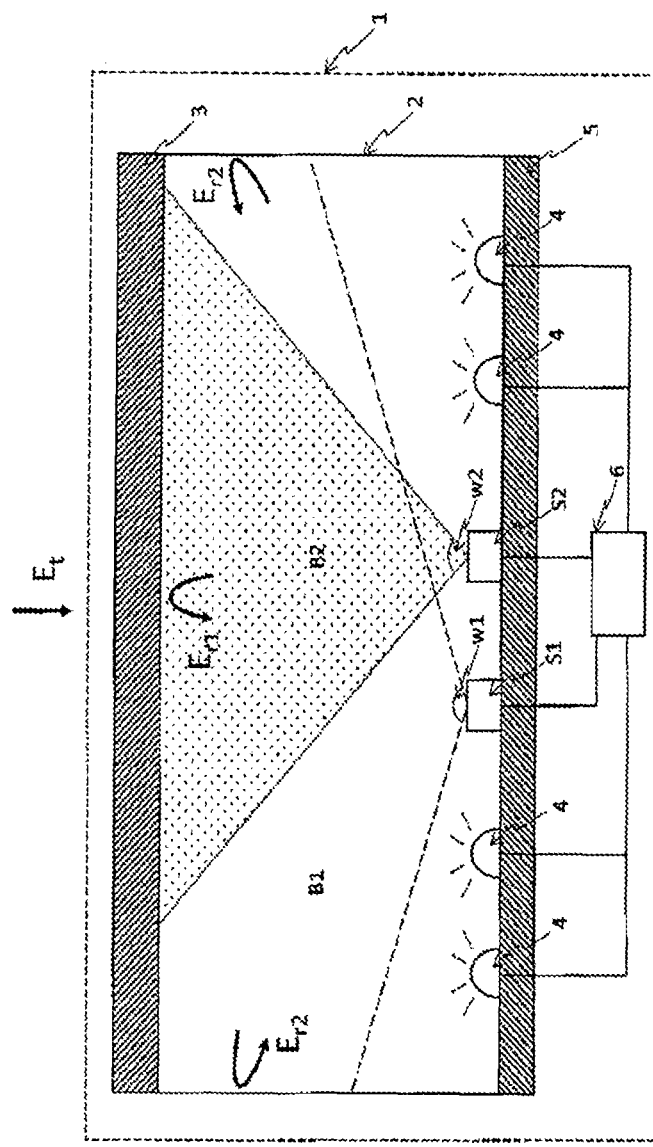
FIG. 2 is a schematic representation of a further preferred embodiment of a luminaire according to the invention.

FIG. 2 shows a schematic representation of a further preferred embodiment of a luminaire according to the invention.

The above description of the luminaire according to one aspect of the present invention is accordingly applicable for the luminaire 1 of FIG. 2.

The luminaire 1 shown in FIG. 2 corresponds to the luminaire shown in FIG. 1. Consequently, the above description of the luminaire of FIG. 1 is likewise applicable for the luminaire 1 of FIG. 2.

In the following, essentially only the differences between the luminaire 1 of FIG. 2 and the luminaire shown in FIG. 1 are described in order to avoid repetition. Otherwise, reference is made to the above description of the luminaire in FIG. 1.

The luminaire 1 of FIG. 2 differs from the luminaire of FIG. 1 in that the luminaire 1 of FIG. 2 comprises a processing device 6.

The processing device 6 can be designed like the processing device described with respect to the luminaire according to one aspect of the present invention.

The processing device 6 can be a process, a microprocessor, a controller, a microcontroller, an application-specific integrated circuit (ASIC) or any combination of these elements.

According to FIG. 2, the processing device 6 of the luminaire 1 is arranged in the area outside of the housing 2 of the luminaire 1. Alternatively, the processing device 6 can also be arranged within the housing 2, i.e., in the housing interior of the luminaire 1. In particular, the processing device 6 can be arranged on the printed circuit board 5.

As shown in FIG. 2, the two light sensors S1 and S2 are set up to supply their detection values or detection results to the processing device 6 (cf. lines between the light sensors S1, S2 and the processing device 6).

The processing device 6 is then set up to determine the ambient light of the luminaire 1 on the basis of the detection values that were detected by the two light sensors S1 and S2. In other words, the processing device 6 is set up to process the detection values detected by the two light sensors S1 and S2 in order to determine the ambient light of the luminaire 1.

For this purpose, the processing device 6 is set up to determine the light emitted by the illuminants 4 on the basis of detection values which the first light sensor S1 detects. In other words, the processing device 6 is set up to determine the light emitted by the illuminants 4 on the basis of the detection result of the first light sensor S1. The detection values or the detection result of the first light sensor S1 make it possible to deduce the light emitted by the illuminants 4. As already stated above, the first light sensor S1 detects the light $E_t$ entering through the diffusion panel 3 into the housing interior of the luminaire 1 from the area outside of the housing 2, and the light $E_{r1}$ and $E_{r2}$ emitted by the illuminants 4 and reflected from the diffusion panel 3 and at least one wall of the housing interior.

The processing device 6 is set up to determine, on the basis of the detection result of the first light sensor S1, the light proportion $E_{r2}$ of the light detected by the first light sensor S1, which light proportion is emitted by the illuminants 4 and is reflected from at least one wall of the housing interior. The processing device 6 is then set up to determine the light emitted or radiated by the illuminants 4 on the basis of this determined light proportion $E_{r2}$. In other words, the processing device 6 is then set up to deduce the light emitted or radiated by the illuminants 4 on the basis of this determined light proportion $E_{r2}$.

In particular, for this purpose the walls of the housing interior of the luminaire 1 are designed such that the light $E_{r2}$ emitted by the illuminants 4 and reflected from at least one wall of the housing interior differs from the light $E_{r1}$ emitted by the illuminants 4 and reflected from the diffusion panel 3.

The processing device 6 is set up to determine the ambient light of the luminaire on the basis of the detection values detected by the second light sensor S2 as well as on the basis of the light emitted by the illuminants 4, which was determined on the basis of the detection values detected by the first light sensor S1. In other words, the processing device 6 is set up to determine the ambient light of the luminaire on the basis of the detection result of the second light sensor S2 and of the light proportion determined on the basis of the detection result of the first light sensor S1, said light component being emitted by the illuminants 4.

The detection values or the detection result of the second light sensor S2 make it possible to deduce the light $E_t$ which enters through the diffusion panel 3 into the housing interior from the area outside of the luminaire housing 2 and consequently the ambient light of the luminaire 1. The second light sensor S2 detects exclusively light from the region of the diffusion panel 3, as already stated above. That is to say, the second light sensor S2 detects exclusively light $E_t$ which enters through the diffusion panel 3 into the housing interior from the area outside of the housing 2 and light $E_{r1}$ emitted by the illuminants 4 and reflected from the diffusion panel 3.

The processing device 6 is set up to determine from the light detected by the second light sensor S2—on the basis of the light proportion determined using the detection result of the first light sensor S1, which light component is emitted by the illuminants 4—the light component that enters through the diffusion panel 3 into the housing interior from the area outside of the housing 2. The light detected by the second light sensor S2 corresponds to the light $E_t$ which enters through the diffusion panel 3 into the housing interior from the area outside of the housing 2, and to the light emitted by the illuminants 4 and reflected from the diffusion panel 3. In other words, the processing device 6 is then set up to deduce—on the basis of the light that is emitted by the illuminant 4 and is determined using the detection result of the first light sensor S1, and of the detection result of the second light sensor S2—the light $E_t$ which enters through the diffusion panel 3 into the housing interior from the area outside of the housing 2, and thus the ambient light of the luminaire 1.

The processing device 6 is set up to determine the ambient light of the luminaire 1 using mathematical models/algorithms and/or comparative measurements of known light situations of the surroundings of the luminaire 1. In other words, the processing device 6 is set up to carry out the above-described processing of the detection values of the two light sensors S1 and S2 using mathematical models/algorithms and/or comparative measurements of known light situations of the surroundings of the luminaire 1 in order to determine the ambient light of the luminaire 1.

The mathematical models/algorithms and/or comparative measurements of known light situations of the surroundings of the luminaire 1 are stored in a memory of the luminaire 1 (not shown in FIG. 2), which the processing device 6 can access. The processing device 6 can in particular write data into the memory and read data from the memory. The memory is preferably a component of the processing device 6.

Additionally or alternatively, the mathematical models/algorithms and/or comparative measurements, which are preferably stored in the memory, can be supplied to the processing device 6 from the area outside of the luminaire 1.

In particular, the processing device 6 is set up to generate at least one characteristic curve on the basis of the comparison measurements and to determine the ambient light of the luminaire 1 using the at least one characteristic curve. Consequently, the processing device 6 is set up to carry out the above-described processing of the detection values of the two light sensors S1 and S2 using the at least one characteristic curve in order to determine the ambient light of the luminaire 1. The processing device 6 can store the at least one characteristic curve in the memory.

With the luminaire 1 according to the invention, it is thus possible to ensure correct detection of the ambient light of the luminaire 1 for different dimming levels or dimming values of the light emission of the illuminants 4 as well as temporally changing reflecting light proportions in the housing interior of the luminaire 1.

As indicated in FIG. 2, the processing device 6 is in particular also set up to control or set the light emission of the illuminants 4 of the luminaire 1 (cf. lines between the illuminants 4 and the processing device 6).

The processing device 6 is set up to control the light emission of the illuminants 4 on the basis of the determined ambient light of the luminaire 1. In other words, the processing device 6 is set up to control the light emission of the illuminants 4 on the basis of the detection values of the two light sensors S1 and S2. That is to say, the processing device 6 is set up to process the detection values of the two light sensors S1 and S2 as described above in order to determine the ambient light of the luminaire 1 and to control the light emission of the illuminants 4 on the basis of the determined ambient light.

In particular, the processing device 6 is set up to deduce the brightness of the surroundings of the luminaire 1 on the basis of the determined ambient light of the luminaire 1 and to control the light emission of the illuminants 4 on the basis of the brightness of the surroundings of the luminaire 1 in such a way that a brightness setpoint value for the surroundings is attained. In other words, the processing device 6 is set up to determine the brightness of the surroundings of the luminaire 1 on the basis of the determined ambient light of the luminaire 1 and to carry out a regulation of the light emission of the illuminants 4 on the basis of the determined ambient brightness with respect to a brightness setpoint value. The processing device 6 is therefore set up to regulate the light emission of the illuminants 4.

The brightness setpoint value can be supplied to the processing device 6 from outside or from the area outside of the luminaire 1 and/or be stored in the memory of the luminaire 1 (not shown in FIG. 2).

Consequently, by changing or setting the brightness setpoint value, the light emission of the illuminants 4 and consequently the light emission of the luminaire 1 can be changed, in particular dimmed.

The processing device 6 is preferably set up to control the light emission of the illuminants 4 on the basis of at least one control command, such as a dimming value, wherein the processing device 6 is set up to obtain or receive the at least one control command supplied from outside or from the area outside of the luminaire 1. The higher a dimming value supplied, the higher the light emission of the illuminants 4 should preferably be.

Figure 4:
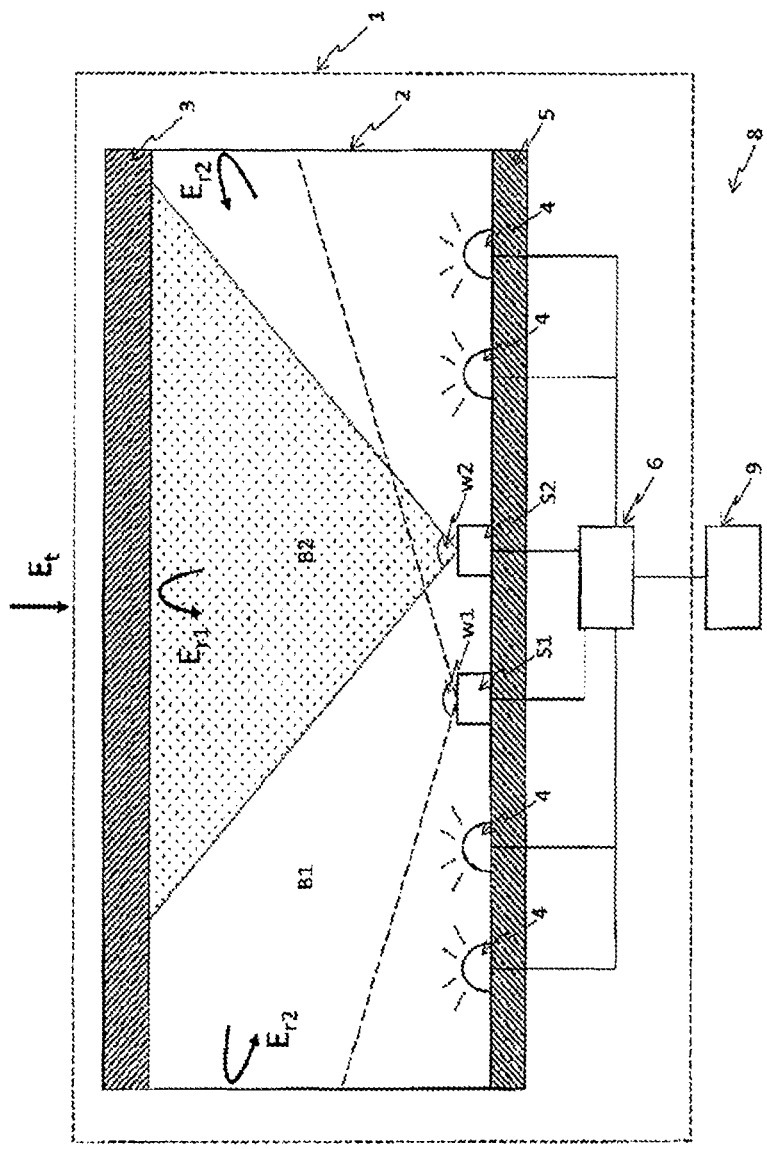
FIG. 4 is a schematic representation of a further preferred embodiment of a lighting system according to the invention.

The processing device 6 can in particular also be set up to provide or transmit the detection results or detection values of the two light sensors S1 and S2 and/or the determined ambient light of the luminaire 1 to the outside or to the area outside of the luminaire 1. In particular, the processing device 6 can be set up to provide or transmit the detection results of the two light sensors S1 and S2 and/or the determined ambient light of the luminaire 1 to at least one further processing device or control device, such as, for example, a global processing device of a lighting system in which the luminaire 1 can be arranged, to the outside or to the area outside of the luminaire 1. Such a preferred embodiment is shown in FIG. 4, which shows a lighting system 8 comprising a luminaire 1 according to FIG. 2 and a global processing device 9.

According to FIG. 2, the processing device 6 is a component of the luminaire 1. However, the processing device 6 can also not be a component of the luminaire 1 and can consequently be an external processing device 6 (not shown in FIG. 2). This case is shown in FIG. 3.

Figure 3:
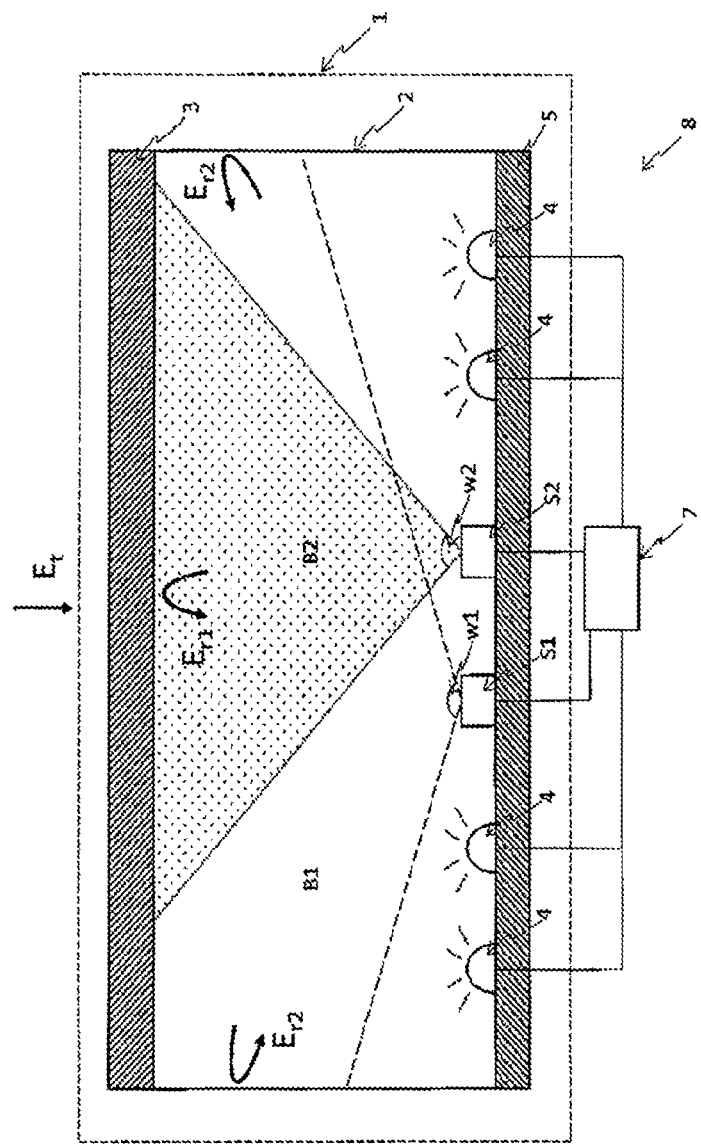
FIG. 3 is a schematic representation of a preferred embodiment of a lighting system according to the invention.

FIG. 3 shows a schematic representation of a preferred embodiment of a lighting system according to the invention.

The above description of the lighting system according to a further aspect of the present invention is accordingly applicable for the lighting system 8 of FIG. 3.

According to FIG. 3, the lighting system 8 comprises a luminaire 1 and a processing device 7, wherein the processing device 7 is set up to obtain detection values supplied directly from the light sensors S1 and S2 of the luminaire 1 and to determine the ambient light of the luminaire 1 on the basis of these. The processing device 7 is further set up to control the light emission of the illuminants 4, in particular on the basis of the determined ambient light.

The above description of the luminaire according to one aspect of the present invention is accordingly applicable for the luminaire 1 of the lighting system 8 of FIG. 3.

The luminaire 1 of the lighting system 8 of FIG. 3 corresponds to the luminaire shown in FIG. 1, so that the above description of the luminaire of FIG. 1 is also applicable for the luminaire 1 of the lighting system 8 of FIG. 3. As a result, no further statements are made regarding the luminaire 1 of the lighting system 8 of FIG. 3, but reference is merely made to the above description of the luminaire of FIG. 1 in order to avoid repetition.

The processing device 7 of the lighting system 8 of FIG. 3 corresponds to the processing device of the luminaire shown in FIG. 2, so that the above description of the processing device of the luminaire shown in FIG. 2 is also applicable for the processing device 7 of the lighting system 8 of FIG. 3. Consequently, in terms of the processing device 7 of FIG. 3, essentially only the differences from the processing device of the luminaire shown in FIG. 2 are described below in order to avoid repetition. Otherwise, reference is made to the above description of the processing device of FIG. 2.

According to FIG. 3, the processing device 7 is arranged in the area outside of the luminaire 1 and with it forms the lighting system 8. The lighting system 8 can also have more than just one luminaire, wherein the processing device 7 is then set up to control the plurality of luminaires, in particular to control them in the same way as the luminaire 1. At least one luminaire of the further optional luminaires of the lighting system 8 can be designed like the luminaire 1 shown in FIG. 3.

The processing device 7 of the lighting system 8 of FIG. 3 is set up in the same way as the processing device 6 of FIG. 2 to process the detection values of the two light sensors S1 and S2 of the luminaire 1 in order to determine the ambient light of the luminaire 1, and to control the light emission of the illuminants 4 of the luminaire 1 on the basis of the determined ambient light and/or at least one external control command.

The processing device 7 can in particular also be set up to provide or transmit the detection results or detection values of the two light sensors S1 and S2 and/or the determined ambient light of the luminaire 1 to a further optional device of the lighting system 8, such as, for example, a further processing device or control device or a further luminaire.

Preferably, the processing device 7 can also be set up to control the light emission from at least one further luminaire on the basis of the detection results or detection values of the two light sensors S1 and S2 and/or of the determined ambient light of the luminaire 1 in the event that the lighting system 8 also comprises at least one further luminaire in addition to the luminaire 1.

FIG. 4 shows a schematic representation of a further preferred embodiment of a lighting system according to the invention.

The above description of the lighting system according to a further aspect of the present invention is accordingly applicable for the lighting system 8 of FIG. 4.

The lighting system 8 of FIG. 4 differs from the lighting system of FIG. 3 in that the luminaire 1 of the lighting system 8 of FIG. 4, like the luminaire shown in FIG. 2, comprises a processing device 6.

The luminaire 1 of the lighting system 8 of FIG. 4 corresponds to the luminaire shown in FIG. 2, so that the above description of the luminaire of FIG. 1 and the above description of the luminaire of FIG. 2 are also applicable for the luminaire 1 of the lighting system 8 of FIG. 4. As a result, no further statements are made regarding the luminaire 1 of the lighting system 8 of FIG. 4, but reference is merely made to the above description of the luminaire of FIG. 1 and the above description of the luminaire in FIG. 2 in order to avoid repetition.

The lighting system 8 shown in FIG. 4 comprises, in addition to the luminaire 1, a processing device 9, which can also be referred to as a global processing device.

The processing device 6 of the luminaire 1 is set up to provide or transmit to the global processing device 9 the detection results or detection values of the two light sensors S1 and S2 and/or the determined ambient light of the luminaire 1 to the outside or to the area outside of the luminaire 1.

The global processing device 9 is thus set up to obtain detection values supplied indirectly, namely via the processing device 6 of the luminaire 1, from the light sensors S1 and S2.

The global processing device 9 is preferably set up to supply at least one control command and/or a brightness setpoint value to the processing device 6 of the luminaire 1 in order to control the light emission of the illuminants 4 of the luminaire 1 and consequently the light emission of the luminaire 1.

In particular, the global processing device 9 is set up to control the light emission of the luminaire 1 on the basis of detection results or detection values of the two light sensors S1 and S2 of the luminaire 1 and/or of the determined ambient light of the luminaire 1.

The lighting system 8 of FIG. 4 can also have more than just one luminaire, wherein the global processing device 9 is then set up to control the plurality of luminaires. In particular, the global processing device 9 is then set up to control the plurality of luminaires in the same manner as the luminaire 1. At least one luminaire of the further optional luminaires of the lighting system 8 can be designed like the luminaire 1 shown in FIG. 4 or like the luminaire shown in FIG. 1.

Preferably, the global processing device 9 can also be set up to control the light emission from at least one further luminaire on the basis of detection results or detection values of the two light sensors S1 and S2 of the luminaire 1 and/or of the determined ambient light of the luminaire 1, in the event that the lighting system 8 also comprises at least one further luminaire in addition to the luminaire 1.

The invention claimed is:

1. A luminaire (1) comprising:
a housing (2) having a diffusion panel (3) as a light emission surface,
at least one illuminant (4) which is arranged within the housing (2) to emit light through the diffusion panel (3) to the area outside of the housing (2), and
comprising at least two light sensors (S1, S2) arranged within the housing (2), the light sensors being set up to detect light and output a respective detection value, wherein the at least two light sensors (S1, S2) have different detection regions (B1, B2) and are set up to detect incident light ($E_t$) entering the housing through the diffusion panel (3),
at least the detection region of a first light sensor (S1) of the at least two light sensors (S1, S2) is such that light ($E_{r2}$) emitted by the at least one illuminant (4) and reflected from at least one wall of the housing interior is detected; and
a processing device (6) that controls the brightness of the at least one illuminant (4) and determines ambient light in the vicinity the luminaire (1) on the basis of the detection values output by the at least two light sensors (S1, S2);
wherein the proportion of the detected light that originally emitted from the at least one illuminant (4) in the luminaire housing is deduced from the detection values from the at least two light sensors S1, S2, thereby enabling the level of ambient light in the vicinity of the luminaire to be determined.

2. The luminaire (1) according to claim 1,
wherein the detection region of the second light sensor (S2) of the at least two light sensors (S1, S2) is such that exclusively light from the region of the diffusion panel (3) is detected by the second light sensor.

3. The luminaire (1) according to claim 1,
wherein the at least two light sensors (S1, S2) are arranged within the housing such that they have the different detection regions (B1, B2).

4. The luminaire (1) according to claim 1,
wherein at least one light sensor of the at least two light sensors (S1, S2) comprises a mechanical and/or optical device which is set up to change, in particular to enlarge and/or reduce, the detection region of the at least one light sensor, so that the at least two light sensors (S1, S2) have the different detection regions (B1, B2).

5. The luminaire (1) according to claim 1,
wherein the at least one illuminant (4) and the at least two light sensors (S1, S2) are arranged in the luminaire housing on a printed circuit board.

6. The luminaire (1) according to claim 1, wherein the processing device (6) is set up to determine the ambient light of the luminaire (1) using mathematical models and/or comparative measurements of known light situations of the surroundings of the luminaire (1).

7. The luminaire (1) according to claim 1,
wherein the processing device (6) is set up to control the light emission of the at least one illuminant (4) on the basis of the detection values.

8. A lighting system (8) comprising:
at least one luminaire (1) according to claim 1.

9. A method for detecting the ambient light of a luminaire (1) according to claim 1, comprising the following method steps:
detecting, by means of the at least two light sensors (S1, S2) of the luminaire (1) that have different detection regions (B1, B2) within the housing (2), light which enters through the diffusion panel (3) into the housing interior from the area outside of the housing (1),
detecting, by means of at least one first light sensor (S1) of the at least two light sensors (S1, S2), light ($E_{r2}$) which is emitted by the at least one illuminant (4) and is reflected from at least one wall of the housing interior; and
determining, by means of the processing device (6), ambient light of the luminaire (1) on the basis of detection values from the at least two light sensors (S1, S2), wherein the proportion of the detected light that originally emitted from the at least one illuminant (4) in the luminaire housing is deduced from the detection values from the at least two light sensors S1, S2, thereby enabling the level of ambient light in the vicinity of the luminaire to be determined.

10. The luminaire (1) according to claim 1, wherein the processing device (6) is set up to dim the light emission of the at least one illuminant (4) on the basis of the determined ambient light.

* * * * *